United States Patent
Goutay et al.

(10) Patent No.: US 11,848,735 B2
(45) Date of Patent: Dec. 19, 2023

(54) METHOD AND APPARATUS FOR OPTIMIZATION OF SIGNAL SHAPING FOR A MULTI-USER MULTIPLE INPUT MULTIPLE OUTPUT (MU-MIMO) COMMUNICATION SYSTEM

(71) Applicant: Nokia Technologies Oy, Espoo (FI)

(72) Inventors: Mathieu Goutay, Paris (FR); Jakob Hoydis, Paris (FR); Faycal Ait Aoudia, Saint-Cloud (FR)

(73) Assignee: Nokia Technologies Oy, Espoo (FI)

( * ) Notice: Subject to any disclaimer, the term of this patent is extended or adjusted under 35 U.S.C. 154(b) by 255 days.

(21) Appl. No.: 17/316,906

(22) Filed: May 11, 2021

(65) Prior Publication Data
US 2021/0367654 A1   Nov. 25, 2021

(30) Foreign Application Priority Data
May 19, 2020   (FI) ...................................... 20205507

(51) Int. Cl.
*H04L 5/04* (2006.01)
*H04B 7/06* (2006.01)
(Continued)

(52) U.S. Cl.
CPC ........... *H04B 7/0634* (2013.01); *G06N 20/00* (2019.01); *H04B 7/0452* (2013.01)

(58) Field of Classification Search
CPC . G06N 3/04; G06N 3/08; G06N 20/00; H04B 7/0452; H04B 7/0634; H04L 5/0023; H04L 25/0202; H04L 25/03318; H04L 27/0008; H04L 27/2035; H04L 27/3405; H04L 27/3411; H04L 27/362; H04L 27/38; H04W 16/28; H04W 24/02
See application file for complete search history.

(56) References Cited

U.S. PATENT DOCUMENTS

| 10,429,486 B1 * | 10/2019 | O'Shea ................ H04B 1/0003 |
| 2018/0367192 A1 | 12/2018 | O'Shea et al. |

(Continued)

FOREIGN PATENT DOCUMENTS

| CN | 109246048 A | 1/2019 |
| CN | 110535802 A | 12/2019 |

(Continued)

OTHER PUBLICATIONS

Zhu et al., Joint Transceiver Optimization for Wireless Communication PHY with Convolutional Neural Network, arXiv, 21 pages, Aug. 9, 2018.*

(Continued)

*Primary Examiner* — Frank Duong
(74) *Attorney, Agent, or Firm* — Joseph C. Drish; Harrington & Smith

(57) ABSTRACT

An apparatus for optimization of signal shaping for a multi user multiple input multiple output, MU-MIMO, communication system, including circuitry configured for receiving a bit vector; and for determining a constellation vector, wherein the circuitry for determining the constellation vector includes a Geometric Shaping and Labeling Block, GSLB, for modulating the bit vector, wherein the GSLB is configured to implement an algorithm with one or more trainable parameters.

15 Claims, 11 Drawing Sheets

(51) Int. Cl.
  *G06N 20/00* (2019.01)
  *H04B 7/0452* (2017.01)

(56) References Cited

U.S. PATENT DOCUMENTS

2020/0044770 A1 2/2020 Lefevre .............................. 1/41
2020/0092009 A1 3/2020 Bocherer et al. ............... 10/612

FOREIGN PATENT DOCUMENTS

| CN | 110719239 A | | 1/2020 |
|---|---|---|---|
| WO | WO 2018/233932 | * | 12/2018 |
| WO | WO 2019/080987 A1 | | 5/2019 |

OTHER PUBLICATIONS

Alvarado et al., End-to-End Learning of Geometrical Shaping Maximizing Generalized Mutual Information, arXiv, 3 pages, Dec. 11, 2019.*

Jardel, Fanny, et al., "Experimental Comparison of 64-QAM and Combined Geometric-Probabilistic Shaped 64-QAM", Sep. 17-21, 2017, 2017 European Conference on Optical Communication (ECOC), abstract only, 1 pg.

Guo, Shuaishuai, et al., "Signal Shaping for Generalized Spatial Modulation and Generalized Quadrature Spatial Modulation", Jun. 11, 2019, IEEE Transactions on wireless Communications, abstract only, 2 pgs.

Jiang, Chengxin, et al., "An Uplink SCMA Codebook Design Combining Probabilistic Shaping and Geometric Shaping", Apr. 22, 2020, IEEE, 11 pgs.

Stark, Maximilian, et al., "Joint Learning of Geometric and Probabilistic Constellation Shaping", Dec. 9-13, 2019, 2019 IEEE Globecom Workshops, 6 pgs.

Jones, Rasmus T., et al. "Geometric Constellation Shaping for Fiber Optic Communication Systems via End-to-end Learning", IEEE, Oct. 2018, 9 pages.

* cited by examiner ions. Conventional signal shaping i.e. geometric and probabilistic QAM constellation shaping is expected to achieve record-high bits/s/Hz/polarization in optical and THz wireless communication systems. Further, conventional modulation schemes (for example, Quadrature Amplitude Modulation (QAM)) are sub-optimal and are mainly chosen for implementational convenience. Signal shaping for quadrature amplitude modulation (QAM) may be used for overcoming the challenges caused by the high order constellations. However, it is difficult to compute a modulation scheme that achieves the best information rate.

METHOD AND APPARATUS FOR OPTIMIZATION OF SIGNAL SHAPING FOR A MULTI-USER MULTIPLE INPUT MULTIPLE OUTPUT (MU-MIMO) COMMUNICATION SYSTEM

TECHNICAL FIELD

Various example embodiments relate to a method and an apparatus for optimization of signal shaping for a multi-user multiple input multiple output (MU-MIMO) communication systems.

BACKGROUND

Communication systems such as Multiple Input/Multiple Output (MIMO) communication systems are known systems which use multiple antennas at a transmitter and receiver along with advanced digital signal processing to improve link quality and capacity. The MIMO communication system is used for multiplying the capacity of a radio link using multiple transmitting and receiving antennas to exploit multipath propagation. By exploiting the multipath propagation, MIMO facilitates transmitting and receiving more than one data signal simultaneously over the same radio channel.

With MU-MIMO, a base station is equipped with multiple antennas, and serves multiple single-antenna users simultaneously. It should be noted that spatial multiplexing is enabled by the multiple antennas at the base station, which is leveraged to separate the different users. Thus, MU-MIMO is a key enabling technology of 5G wireless communication standard. Looking forward to beyond 5G wireless communication standard, signal shaping is foreseen as a key enabler of future wireless communication systems. Signal shaping provides a way to achieve record-high spectral efficiency. Further, achieving enhanced performance in bit rates will require the use of very high constellation modulation. However, such high order constellations are sensitive to non-linearities in a transmission medium. Therefore, there is a need for an improved technique in order to overcome these challenges caused by the high order constellations.

Conventional signal shaping i.e. geometric and probabilistic QAM constellation shaping is expected to achieve record-high bits/s/Hz/polarization in optical and THz wireless communication systems. Further, conventional modulation schemes (for example, Quadrature Amplitude Modulation (QAM)) are sub-optimal and are mainly chosen for implementational convenience. Signal shaping for quadrature amplitude modulation (QAM) may be used for overcoming the challenges caused by the high order constellations. However, it is difficult to compute a modulation scheme that achieves the best information rate.

Currently, various prototype implementations are available for single-input single-output (SISO) links by implementing the transmitter and the receiver as deep neural networks (NNs) and learning optimal constellation shaping and bit labeling. Further, one or more methodologies such as neural network (NN) based MIMO symbol detection and constellation shaping for an interference channel are employed. The NN-based MIMO symbol detection focuses on the detection of noisy received symbols considering standard modulation schemes, such as binary phase-shift keying (BPSK) or QAM.

However, the optimization of signal shaping has never been considered for the MU-MIMO communication systems. Therefore, there is a need for an improved method and apparatus to optimize the signal shaping for the MU-MIMO communication system, in order to maximize the information rate.

SUMMARY

In accordance with an example embodiment, an apparatus for optimization of signal shaping for a multi-user multiple input multiple output (MU-MIMO) communication system, may be disclosed. The apparatus may comprise means for receiving a bit vector $b_u$, and means for determining a constellation vector $c_u$, wherein the means for determining the constellation vector $c_u$ comprises a Geometric Shaping and Labeling Block (GSLB) for modulating the bit vector $b_u$. Further, the GSLB may be configured to implement an algorithm with one or more trainable parameters $\theta$.

Further, the apparatus may comprise means for determining a one-hot vector $o_u$ from the bit vector $b_u$ and means for determining a channel symbol $x_u$ based on the determined one-hot vector $o_u$ and the constellation vector $c_u$, wherein the constellation vector $c_u$ may be determined from information on channel quality. The information on the channel quality may comprise channel state information (CSI) such as signal-to-noise ratio (SNR), a received signal strength indicator (RSSI), or channel quality indications (CQI). In one example embodiment, the channel symbol $x_u$ may be determined by selecting an element from the constellation vector $c_u$ for the bit vector $b_u$.

In one example embodiment, the apparatus may be configured to implement the algorithm with the one or more trainable parameters $\theta$, by a neural network. The one or more trainable parameters $\theta$ may be the parameters of the algorithm. The term "algorithm having trainable parameters $\theta$" or "algorithm with trainable parameters $\theta$" may be a trained algorithm whose parameters have values, wherein the values are obtained by training the algorithm. In one example embodiment, the parameters such as, but are not limited to, learning rate, batch size, and other parameters of the SGD variant such as Adam or RMSProp, may be the parameters of the algorithm. Such parameters may be used to determine good values for the one or more trainable parameters $\theta$.

In one example embodiment, the GSLB may comprise of one or more dense layers, a real-to-complex, R2C, conversion layer, and a normalization layer and each one of the dense layers having one or more activation functions, and wherein the one or more dense layers of the GSLB may comprise the one or more trainable parameters $\theta$.

The apparatus may further comprise means for training the GSLB by initializing the one or more trainable parameters $\theta$, sampling a plurality of bit vectors $b=(b_1, b_2, \ldots b_U)$, determining a loss function based at least on the plurality of bit vectors $b$, and updating the one or more trainable parameters $\theta$ by performing a Stochastic Gradient Descent (SGD) operation on a loss function. The SGD operation may be performed until a predefined stop criterion has been satisfied, the predefined stop criterion including a predefined number of iterations or the loss function has not decreased for a predefined number of iterations. Such updating of the one or more trainable parameters $\theta$ assists in optimizing the signal shaping for the MU-MIMO communication system and thus results in maximizing the information rate or communication rate in the MU-MIMO communication system.

In one example embodiment, the loss function may be defined as:

$$L(\theta) = -\frac{1}{B}\sum_{b=1}^{B}\sum_{u=1}^{U}\sum_{i=1}^{k}\left(b_{u,i}^{(b)}\log(p_{u,i}^{(b)}) + (1 - b_{u,i}^{(b)})\log(1 - b_{u,i}^{(b)})\right)$$

where $p_{u,i}^{(b)}$ is the probability that the $i^{th}$ bit sent by the $u^{th}$ user is set to one for the $b^{th}$ training example.

In accordance with another example embodiment, a multi-use multiple input multiple output (MU-MIMO) communication system may be disclosed. The MU-MIMO communication system may comprise a plurality of transmitters, each transmitter of the plurality of transmitters may receive a bit vector $b_u$ and determine a constellation vector $c_u$, wherein determining the constellation vector $c_u$ comprises a Geometric Shaping and Labeling Block (GSLB) for modulating the bit vector $b_u$.

In one example embodiment, each transmitter may determine a one-hot vector $o_u$ from the bit vector $b_u$ and determine a channel symbol $x_u$ based on the determined one-hot vector $o_u$ and the constellation vector $c_u$, wherein the constellation vector $c_u$ is determined from information on channel quality. The information on the channel quality may comprise channel state information (CSI) such as signal-to-noise ratio (SNR), a received signal strength indicator (RSSI), or channel quality indications (CQI). In one example embodiment, the channel symbol $x_u$ may be determined by selecting an element from the constellation vector $c_u$ for the bit vector $b_u$.

Further, the GSLB may be configured to implement an algorithm with one or more trainable parameters θ, by a neural network. The one or more trainable parameters θ may be the parameters of the algorithm. The term "algorithm having trainable parameters θ" or "algorithm with trainable parameters θ" may be a trained algorithm whose parameters have values, wherein the values are obtained by training the algorithm. In one example embodiment, the parameters such as, but are not limited to, learning rate, batch size, and other parameters of the SGD variant such as Adam or RMSProp, may be the parameters of the algorithm. Such parameters may be used to determine good values for the one or more trainable parameters θ.

In one example embodiment, the GSLB may comprise of one or more dense layers, a real-to-complex, R2C, conversion layer, and a normalization layer and each one of the dense layers having one or more activation functions, and wherein the one or more dense layers of the GSLB may comprise the one or more trainable parameters θ.

In one example embodiment, the GSLB may be trained by initializing the one or more trainable parameters θ, sampling a plurality of bit vectors $b=(b_1, b_2, \ldots b_U)$, determining a loss function based at least on the plurality of bit vectors b, and updating the one or more trainable parameters θ by performing a Stochastic Gradient Descent (SGD) operation on a loss function. The SGD operation may be performed until a predefined stop criterion has been satisfied, the predefined stop criterion including a predefined number of iterations or the loss function has not decreased for a predefined number of iterations. Such updating of the one or more trainable parameters θ assists in optimizing the signal shaping for the MU-MIMO communication system and thus results in maximizing the information rate or communication rate in the MU-MIMO communication system.

In one example embodiment, the loss function may be defined as:

$$L(\theta) = -\frac{1}{B}\sum_{b=1}^{B}\sum_{u=1}^{U}\sum_{i=1}^{k}\left(b_{u,i}^{(b)}\log(p_{u,i}^{(b)}) + (1 - b_{u,i}^{(b)})\log(1 - b_{u,i}^{(b)})\right)$$

where $p_{u,i}^{(b)}$ is the probability that the $i^{th}$ bit sent by the $u^{th}$ user is set to one for the $b^{th}$ training example.

In one example embodiment, each transmitter of the plurality of transmitters may be configured to share the one or more trainable parameters θ of the GSLB.

The MU-MIMO communication system may further comprise a MIMO channel and a receiver, wherein the receiver is configured to implement a demodulation and/or a demapping algorithm with one or more trainable parameters θ, and wherein the initializing step may comprise jointly initializing the one or more trainable parameters θ and the one or more trainable parameters θ and the updating step may comprise jointly updating the one or more trainable parameters θ and the one or more trainable parameters θ.

In accordance with yet another example embodiment, a method for optimization of signal shaping for a multi-user multiple input multiple output (MU-MIMO) communication system comprising a plurality of transmitters, may be disclosed. The method may comprise at each transmitter, receiving a bit vector $b_u$ and determining a constellation vector $c_u$, wherein the constellation vector $c_u$ is determined using a Geometric Shaping and Labeling Block, GSLB, for modulating the bit vector $b_u$, wherein the GSLB is configured to implement an algorithm with one or more trainable parameters θ.

The method may further comprise at each transmitter, determining a one-hot vector $o_u$ from the bit vector $b_u$ and determining a channel symbol $x_u$ based on the determined one-hot vector $o_u$ and the constellation vector $c_u$, wherein the constellation vector $c_u$ is determined from information on channel quality. The information on the channel quality may comprise channel state information (CSI) such as signal-to-noise ratio (SNR), a received signal strength indicator (RSSI), or channel quality indications (CQI). In one example embodiment, the channel symbol $x_u$ may be determined by selecting an element from the constellation vector $c_u$ for the bit vector $b_u$.

In one example embodiment, the algorithm with the one or more trainable parameters θ, may be implemented by a neural network. The one or more trainable parameters θ may be the parameters of the algorithm. The term "algorithm having trainable parameters θ" or "algorithm with trainable parameters θ" may be a trained algorithm whose parameters have values, wherein the values are obtained by training the algorithm. In one example embodiment, the parameters such as, but are not limited to, learning rate, batch size, and other parameters of the SGD variant such as Adam or RMSProp, may be the parameters of the algorithm. Such parameters may be used to determine good values for the one or more trainable parameters θ.

In one example embodiment, the GSLB may comprise of one or more dense layers, a real-to-complex, R2C, conversion layer, and a normalization layer and each one of the dense layers having one or more activation functions, and wherein the one or more dense layers of the GSLB may comprise the one or more trainable parameters θ.

The method may further comprise training the GSLB by initializing the one or more trainable parameters θ, sampling a plurality of bit vectors b=(b$_1$, b$_2$, ... b$_U$), determining a loss function based at least on the plurality of bit vectors b, and updating the one or more trainable parameters θ by performing a Stochastic Gradient Descent (SGD) operation on a loss function. The SGD operation may be performed until a predefined stop criterion has been satisfied, the predefined stop criterion including a predefined number of iterations or the loss function has not decreased for a predefined number of iterations. Such updating of the one or more trainable parameters θ assists in optimizing the signal shaping for the MU-MIMO communication system and thus results in maximizing the information rate or communication rate in the MU-MIMO communication system.

In one example embodiment, the loss function may be defined as:

$$L(\theta) = -\frac{1}{B}\sum_{b=1}^{B}\sum_{u=1}^{U}\sum_{i=1}^{k}\left(b_{u,i}^{(b)}\log\left(p_{u,i}^{(b)}\right) + \left(1 - b_{u,i}^{(b)}\right)\log\left(1 - b_{u,i}^{(b)}\right)\right)$$

where $p_{u,i}^{(b)}$ is the probability that the i$^{th}$ bit sent by the u$^{th}$ user is set to one for the b$^{th}$ training example.

In one example embodiment, the MU-MIMO communication system may comprise a MIMO channel and a receiver, wherein the receiver is configured to implement a demodulation and/or a demapping algorithm with one or more trainable parameters Φ, and wherein the initializing step comprises jointly initializing the one or more trainable parameters θ and one or more trainable parameters Φ, and the updating step comprises jointly updating the one or more trainable parameters θ and the one or more trainable parameters Φ.

In accordance with yet another example embodiment, a non-transitory computer-readable medium may be disclosed. The non-transitory computer-readable medium may comprise instructions for causing a processor to perform functions for optimization of signal shaping for a multi-user multiple input multiple output (MU-MIMO) communication system. The MU-MIMO communication system may comprise a plurality of transmitters. The non-transitory computer-readable medium may comprise instructions for causing a processor to perform functions at each transmitter, including receiving a bit vector b$_u$ and determining a constellation vector c$_u$, wherein the constellation vector c$_u$ is determined using a Geometric Shaping and Labeling Block, GSLB, for modulating the bit vector b$_u$, wherein the GSLB is configured to implement an algorithm with one or more trainable parameters θ.

Further, the non-transitory computer-readable medium includes instructions for causing the processor to perform functions at each transmitter, including determining a one-hot vector o$_u$ from the bit vector b$_u$ and determining a channel symbol x$_u$ based on the determined one-hot vector o$_u$ and the constellation vector c$_u$, wherein the constellation vector c$_u$ is determined from information on channel quality. The information on the channel quality may comprise channel state information (CSI) such as signal-to-noise ratio (SNR), a received signal strength indicator (RSSI), or channel quality indications (CQI). In one example embodiment, the channel symbol x$_u$ may be determined by selecting an element from the constellation vector c$_u$ for the bit vector b$_u$.

In one example embodiment, the algorithm with the one or more trainable parameters θ, may be implemented by a neural network. The one or more trainable parameters θ may be the parameters of the algorithm. The term "algorithm having trainable parameters θ" or "algorithm with trainable parameters θ" may be a trained algorithm whose parameters have values, wherein the values are obtained by training the algorithm. In one example embodiment, the parameters such as, but are not limited to, learning rate, batch size, and other parameters of the SGD variant such as Adam or RMSProp, may be the parameters of the algorithm. Such parameters may be used to determine good values for the one or more trainable parameters θ.

In one example embodiment, the GSLB may comprise of one or more dense layers, a real-to-complex, R2C, conversion layer, and a normalization layer and each one of the dense layers having one or more activation functions, and wherein the one or more dense layers of the GSLB may comprise the one or more trainable parameters θ.

The non-transitory computer-readable medium includes instructions for causing the processor to perform functions including training the GSLB by initializing the one or more trainable parameters θ, sampling a plurality of bit vectors b=(b$_1$, b$_2$, ... b$_U$), determining a loss function based at least on the plurality of bit vectors b, and updating the one or more trainable parameters θ by performing a Stochastic Gradient Descent (SGD) operation on a loss function. The SGD operation may be performed until a predefined stop criterion has been satisfied, the predefined stop criterion including a predefined number of iterations or the loss function has not decreased for a predefined number of iterations. Such updating of the one or more trainable parameters θ assists in optimizing the signal shaping for the MU-MIMO communication system and thus results in maximizing the information rate or communication rate in the MU-MIMO communication system.

In one example embodiment, the loss function may be defined as:

$$L(\theta) = -\frac{1}{B}\sum_{b=1}^{B}\sum_{u=1}^{U}\sum_{i=1}^{k}\left(b_{u,i}^{(b)}\log\left(p_{u,i}^{(b)}\right) + \left(1 - b_{u,i}^{(b)}\right)\log\left(1 - b_{u,i}^{(b)}\right)\right)$$

where $p_{u,i}^{(b)}$ is the probability that the i$^{th}$ bit sent by the u$^{th}$ user is set to one for the b$^{th}$ training example.

In one example embodiment, the MU-MIMO communication system may comprise a MIMO channel and a receiver, wherein the receiver is configured to implement a demodulation and/or a demapping algorithm with one or more trainable parameters Φ, and wherein the initializing step may comprise jointly initializing the one or more trainable parameters θ and one or more trainable parameters Φ, and the updating step may comprise jointly updating the one or more trainable parameters θ and the one or more trainable parameters Φ.

Altogether, the apparatus and method according to the exemplary embodiments described herewith allow optimization of signal shaping for a multi-user multiple input multiple output (MU-MIMO) communication systems. Such disclosed technique uses a function with the one or more trainable parameters θ, e.g., a neural network (NN), which takes as input indications about the channel quality, e.g., the SNR, and provides as output the locations of constellation points in the complex plane. The function is optimized using stochastic gradient descent (SGD) to maximize the information rate. Such machine learning (ML) based methods enable optimization of the signal shaping for any channel model and can account for hardware impairments. Such optimization of the signal shaping i.e. geometric and probabilistic QAM constellation shaping results in achieving record-high bits/s/Hz/polarization in optical and THz wireless communication systems. Thus, such usage of ML based method in 5G networks may result in joint optimization of signal shaping for the MU-MIMO communication systems. In addition, the disclosed method may also result in joint optimization of the modulation, labelling, demodulation, and demapping. Without the use of the trainable GSLB, the optimization of the signal shaping for the MU-MIMO communication system would not be feasible.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include such aspects and their equivalents.

BRIEF DESCRIPTION OF THE DRAWINGS

Further embodiments, details, advantages, and modifications of the present example embodiments will become apparent from the following detailed description of the embodiments, which is to be taken in conjunction with the accompanying drawings, wherein.

DETAILED DESCRIPTION

Some embodiments of this disclosure, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to the listed item or items.

It should also be noted that as used herein and in the appended claims, the singular forms "a," "an," and "the" include plural references unless the context clearly dictates otherwise. Although any apparatus and method similar or equivalent to those described herein can be used in the practice or testing of embodiments of the present disclosure, the apparatus and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

An example embodiment of the present disclosure and its potential advantages are understood by referring to FIGS. 1 through 11 of the drawings, like numerals being used for like and corresponding parts of the various drawings.

Figure 1:
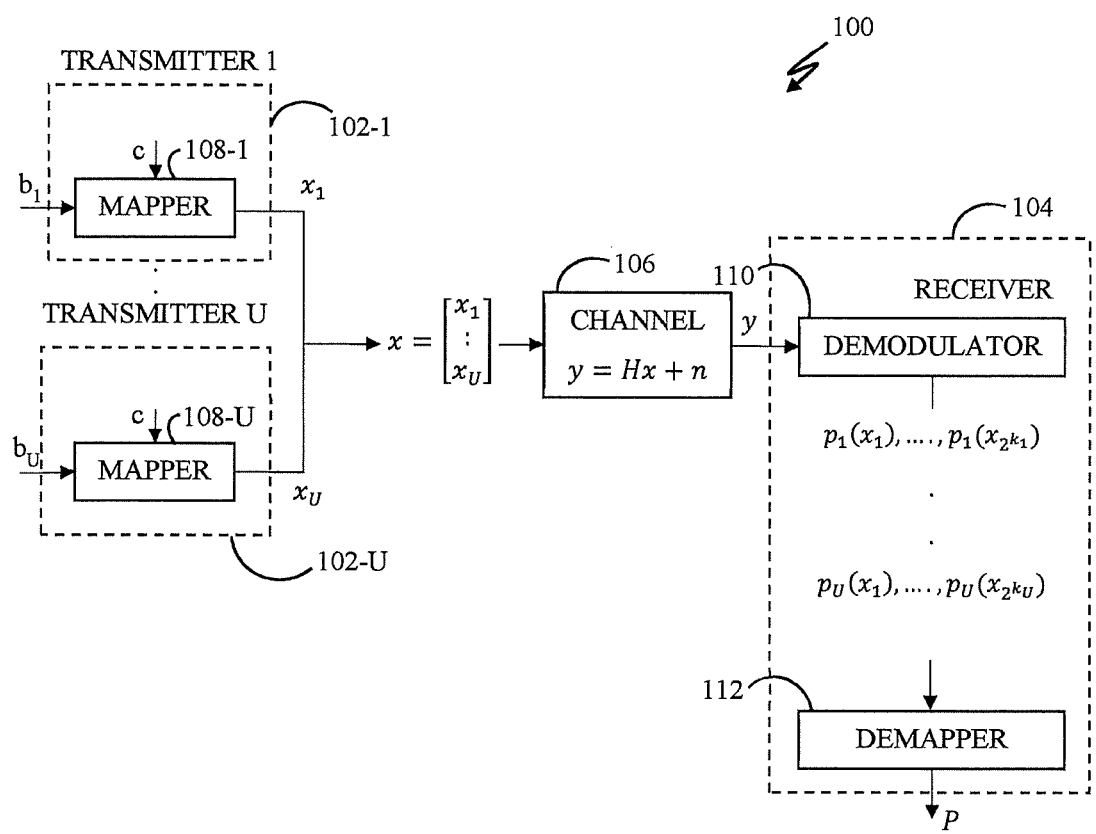
FIG. 1 illustrates a block diagram showing a multi-user multiple input multiple output (MU-MIMO) communication system for optimization of signal shaping, according to an example embodiment of the subject matter described herein.

FIG. 1 illustrates a block diagram showing a multi-user multiple input multiple output (MU-MIMO) communication system 100 for optimization of signal shaping, according to an example embodiment. The MU-MIMO communication system 100 comprising a plurality of transmitters 102-1, . . . 102-U and a receiver 104. Hereinafter, the plurality of transmitters 102-1, . . . 102-U may be referred to as 102. The plurality of transmitters 102 may include a Transmitter 1, Transmitter 2, . . . Transmitter U.

Each one of the transmitter 102 may comprise at least one transmitting antenna and the receiver 104 may comprise at least one receiving antenna. In one example, each one of the transmitter 102 may comprise multiple transmitting antennas and the receiver 104 may comprise multiple receiving antennas. The transmitter 102 may be referred to as and/or may include some or all of the functionality of a user equipment (UE), mobile station (MS), terminal, an access terminal, a subscriber unit, a station, etc. Examples of the transmitter 102 may include, but are not limited to, cellular phones, smartphones, personal digital assistants (PDAs), wireless devices, electronic automobile consoles, sensors, or laptop computers. The receiver 104 may be referred to as a base station. In one example embodiment, the base station may serve the UEs.

Further, each one of the transmitter 102 may communicate with the receiver 104, via a channel 106. In one example embodiment, the channel 106 may be a MIMO channel. The channel 106 between the transmitter 102 and the receiver 104 may have a status or a state. The status of the channel 106 may vary over time. Further, the status of the channel 106 may be described by one or more properties of the channel 106. It should be noted that properties of the channel 106 may, for example, comprise a channel gain, a channel phase, a signal-to-noise N ratio (SNR), a received signal strength indicator (RSSI), or a transfer matrix.

It will be apparent to one skilled in the art that the above-mentioned components of the MU-MIMO communication system 100 have been provided only for illustration purposes. The MU-MIMO communication system 100 may include a plurality of receivers as well, without departing from the scope of the disclosure.

Referring to FIG. 1, each one of the transmitter 102 may communicate with the receiver 104, via the channel 106. As discussed above, each transmitter 102 may comprise a transmitting antenna, used for transmitting signals. It should be noted that each one of the transmitter 102 may simultaneously receive bit vectors $b=b_1, \ldots, b_U$, where $b_u \in \{0,1\}^{k_u}$, $u \in \{1, \ldots, U\}$, with $k_u$ the number of bits per channel use for each one of the transmitter 102. Further, each one of the transmitter 102 may comprise a mapper 108-$i$ (where i=1, 2, . . . or U). Hereinafter, the mapper 108-$i$ may be referred to as a mapper 108. Each one of the transmitter 102 may map an incoming bit vector of $k_u$ bits to a complex baseband channel symbol $x_u \in \mathbb{C}$ according to a constellation vector $c_u$, i.e., a vector containing the points forming a constellation and a labeling scheme.

It should be noted that a constellation may be representation of a signal modulated by a digital modulation scheme such as quadrature amplitude modulation (QAM) or phase-shift keying (PSK) in a digital communication system such as the MU-MIMO communication system 100. Further, the constellation may represent a signal as a distribution of points in the complex plane at symbol sampling instants. Further, the distance of a point from the origin may represent a measure of the amplitude or power of the signal. Such formation of the constellation may improve an information rate. In one example embodiment, the constellation may be, for example, a quadrature amplitude modulation (QAM) and the labeling scheme may be, for example, Gray labeling.

Thereafter, modulated channel symbols i.e. $x=[x_1, \ldots, x_U]^T$ may be transmitted over the channel 106 to the receiver 104. In one example embodiment, the modulated channel symbol $x_u$, where $u \in \{1, \ldots, U\}$, from each transmitting antenna may then be received by the receiving antenna at the receiver 104. The path between each transmitting antenna and each receiving antenna may be modelled by a transfer function and the overall channel transfer function may be formed from the combination of these transfer functions to define a function as follows:

$$y = Hx + n$$

where $y \in \mathbb{C}^N$ is the vector of received samples, N is the number of antennas at the receiver 104,
$H \in \mathbb{C}^{N \times U}$ the channel matrix, and
$n \in \mathbb{C}^N$ the receiver noise vector.

It will be apparent to one skilled in the art that above-mentioned MIMO channel model has been provided only for illustration purposes. In one example embodiment, additional impairments may be added on top of this model due to hardware, without departing from the scope of the disclosure.

Successively, the signals from the receiving antenna, may be extracted at the receiver 104. The receiver 104 may extract data indicative of the original transmission signals. In one example embodiment, the receiver 104 may be configured to perform a MIMO detection of the bit vectors $b=b_1, \ldots, b_U$, where $b_u \in \{0,1\}^{k_u}$, $u \in \{1, \ldots, U\}$, with $k_u$ the number of bits per channel use for each one of the transmitter 102. Further, the receiver 104 may comprise a demodulator 110 and a demapper 112. The demodulator 110 may be configured to provide a probability that a modulated channel symbol of the message is transmitted by transmitting antenna of the multiple transmitting antenna given the received signal. Further, the demodulator 110 may demodulate the modulated channel symbol into $p_1(x_1), \ldots, p_1(x_{2^{k_1}}) \ldots p_U(x_1), \ldots, p_U(x_{2^{k_U}})$.

Further, the demapper 112 may be configured to provide a probability that each bit of the modulated channel symbol is set to one and transmitted by the transmitting antenna of the multiple transmitting antennas. Thereafter, demapping of the received channel symbols may be performed to compute probabilities over the transmitted bits. In one example embodiment, the matrix P may be defined as:

$$P = \{p_{u,i}\}_{(u,i)},$$

where $p_{u,i}$ denotes the probability that the $i^{th}$ transmitted bit by the $u^{th}$ transmitter 102 was set to 1.

In one example embodiment, the demapper 112 may compute log likelihood ratios (LLRs). The LLRs may be defined as $$l_{u,i} = \log\left(\frac{p_{u,i}}{1 - p_{u,i}}\right).$$

Thereafter, the LLRs (i.e. soft-information) may then subsequently be fed to a channel decoder (not shown). In one example embodiment, the channel decoder may be, but is not limited to, belief propagation decoding, polar list-decoding, Turbo decoder, or convolutional decoder. It should be noted that such model may correspond to transmissions on a single sub-carrier in an Orthogonal frequency-division multiplexing (OFDM)-based system or a flat-fading single-carrier system, without departing from the scope of the disclosure.

Figure 2:
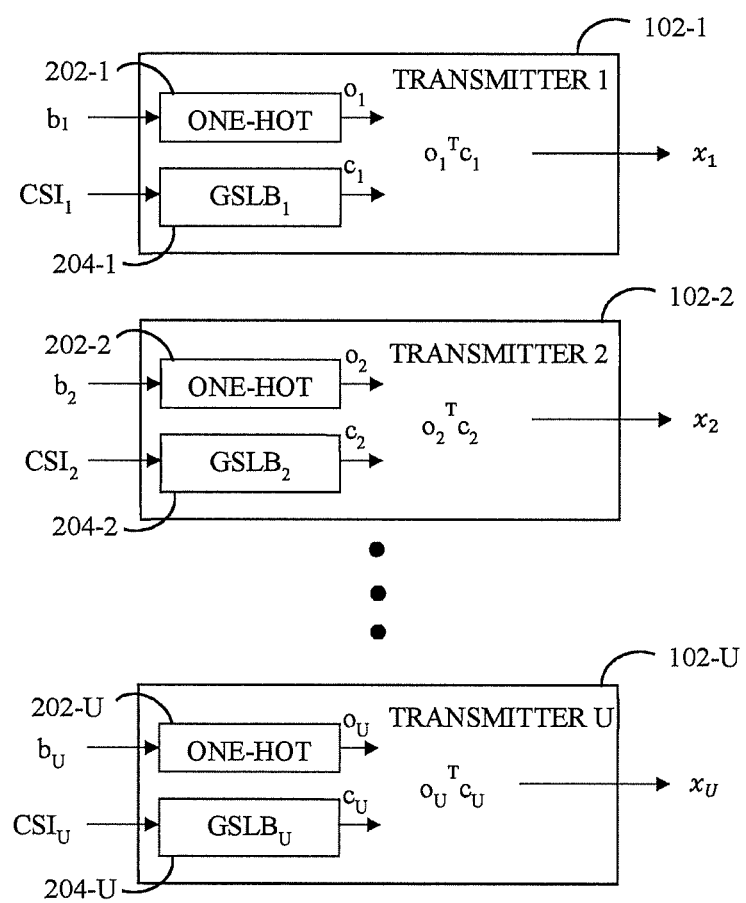
FIG. 2 illustrates a block diagram showing a transmitter architecture, according to an example embodiment of the subject matter described herein.

FIG. 2 illustrates a block diagram showing a transmitter architecture, according to an example embodiment. Each one of the transmitter 102 may comprise one-hot block 202-1, 202-2 . . . 202-U and geometric shaping and labeling block (GSLB) 204-1, 204-2 . . . 204-U. Hereinafter, the one-hot block 202-1, 202-2 . . . 202-U may be referred to as 202 and the geometric shaping and labeling block (GSLB) 204-1, 204-2 . . . 204-U may be referred to as 204. In one example embodiment, the transmitter 102 may be referred to as an apparatus. FIG. 2 is described in conjunction with FIG. 1.

At first, the transmitter 102 may receive bit vectors $b=(b_1, b_2, \ldots b_U)$ $b_u \in \{0,1\}^{k_u}$ Successively, the bit vector $b_u$ may be provided to the one-hot block 202 present within the transmitter 102. It should be noted that users may have same number of bits per channel use $k=k_u$, $u \in \{1, \ldots, U\}$. The one-hot block 202 may convert the bit vector $b_u$ into a vector of dimension k containing only zeroes except a one at the position having $b_u$ as binary representation, to obtain a one-hot vector $o_u$. The one-hot vector $o_u$ may be defined as: onehot($b_u$)=$o_u$. In one example embodiment, if $b_u$=[0,1,1], then onehot($b_u$)=[0, 0, 0, 0, 1, 0, 0, 0]$^T$. Successively, the GSLB 204 may determine a constellation vector $c_u$ from at least the information on channel quality. The information on the channel quality may comprise channel state information (CSI) such as signal-to-noise ratio (SNR), a received signal strength indicator (RSSI), or channel quality indications (CQI).

As shown in FIG. 2, the CSI corresponding to each transmitter 102-1, 102-2, . . . 102-U may be used for determining the constellation vector $c_u$. In one example embodiment, the constellation vector $c_u$ may be defined as $c_u \in \mathbb{C}^{2^k}$. In another example embodiment, the constellation vector $c_u$ may be determined independently i.e. instead of being generated by a neural network fed with the information on the channel quality. In one example embodiment, the constellation vector $c_u$ may be the trainable parameter $\theta$ directly, i.e. $\theta = c_u$. It should be noted that the GSLB 204 present within each transmitter 102, may be configured to implement an algorithm with one or more trainable parameters $\theta$, by the neural network. In one example embodiment, the neural network may be the algorithm with the one or more trainable parameters $\theta$. The one or more trainable parameters $\theta$ may be the parameters of the algorithm. The term "algorithm having trainable parameters $\theta$" or "algorithm with trainable parameters $\theta$" may be a trained algorithm whose parameters have values, wherein the values are obtained by training the algorithm.

The determined constellation vector $c_u$ may be used for modulating the bit vector $b_u$ to a channel symbol $x_u$. In one example embodiment, the channel symbol $x_u$ may be defined as:

$$x_u = \text{onehot}(b_u)^T c_u = o_u^T c_u, \text{ where } x_u \in \mathbb{C}$$

In another example embodiment, the channel symbol $x_u$ may be determined by selecting an element from the constellation vector $c_u$ for the bit vector $b_u$. It will be apparent to one skilled in the art that the above-mentioned determination of the channel symbol $x_u$ has been provided only for illustration purposes, without departing from the scope of the disclosure.

Figure 3:
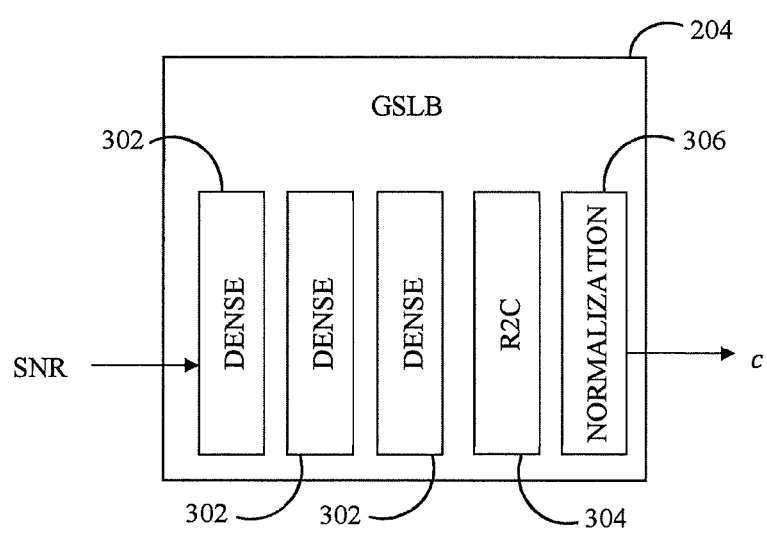
FIG. 3 illustrates a block diagram showing a Geometric Shaping and Labeling Block (GSLB) architecture, according to an example embodiment of the subject matter described herein.

FIG. 3 illustrates a block diagram showing a Geometric Shaping and Labeling Block (GSLB) architecture, according to an example embodiment.

As discussed above, the GSLB 204 may determine the constellation vector $c_u$ from at least one of channel state information (CSI) such as a signal-to-noise ratio (SNR). The GSLB 204 may comprise one or more dense layers 302, a real-to-complex (R2C) conversion layer 304, and a normalization layer 306. Each one of the dense layers 302 may have one or more activation functions such as rectified linear units (ReLU). It should be noted that the one or more dense layers 302 of the GSLB 204 may comprise the one or more trainable parameters $\theta$. The one or more trainable parameters $\theta$ may be the parameters of the algorithm. The term "algorithm having trainable parameters $\theta$" or "algorithm with trainable parameters $\theta$" may be a trained algorithm whose parameters have values, wherein the values are obtained by training the algorithm. In one example embodiment, the GSLB 204 comprises three dense layers, as shown in FIG. 3.

Further, the R2C conversion layer 304 may convert the real numbers into complex numbers. Further, the R2C conversion layer 304 may function to map 2Z real numbers to Z complex numbers, for example, by interpreting one half the real part and the other half as the imaginary part. Thereafter, the normalization layer 306 may ensure that the square magnitude of the complex numbers sum to a fixed number. It will be apparent to one skilled in the art, the CM above-mentioned GSLB architecture has been provided only for illustration purposes, without departing from the scope of the disclosure.

Figure 4:
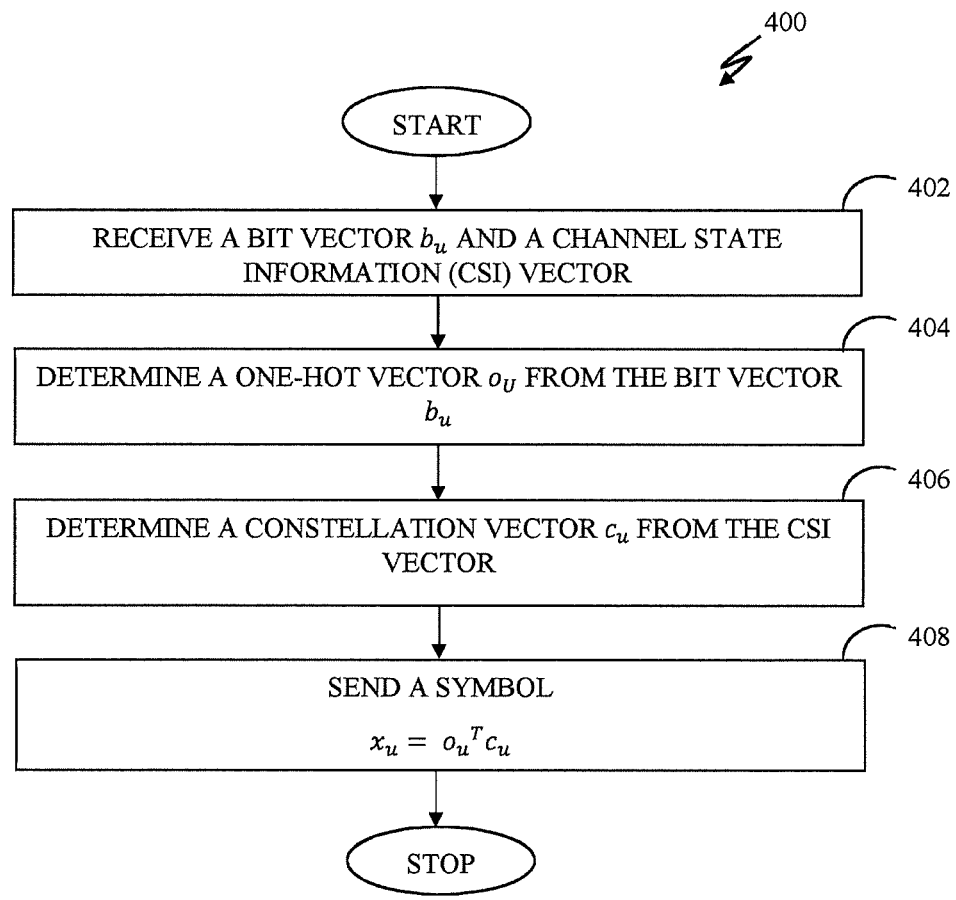
FIG. 4 illustrates a flowchart showing a high level operation of a method for optimization of signal shaping for the MU-MIMO communication system, according to an example embodiment of the subject matter described herein.
Figure 5:
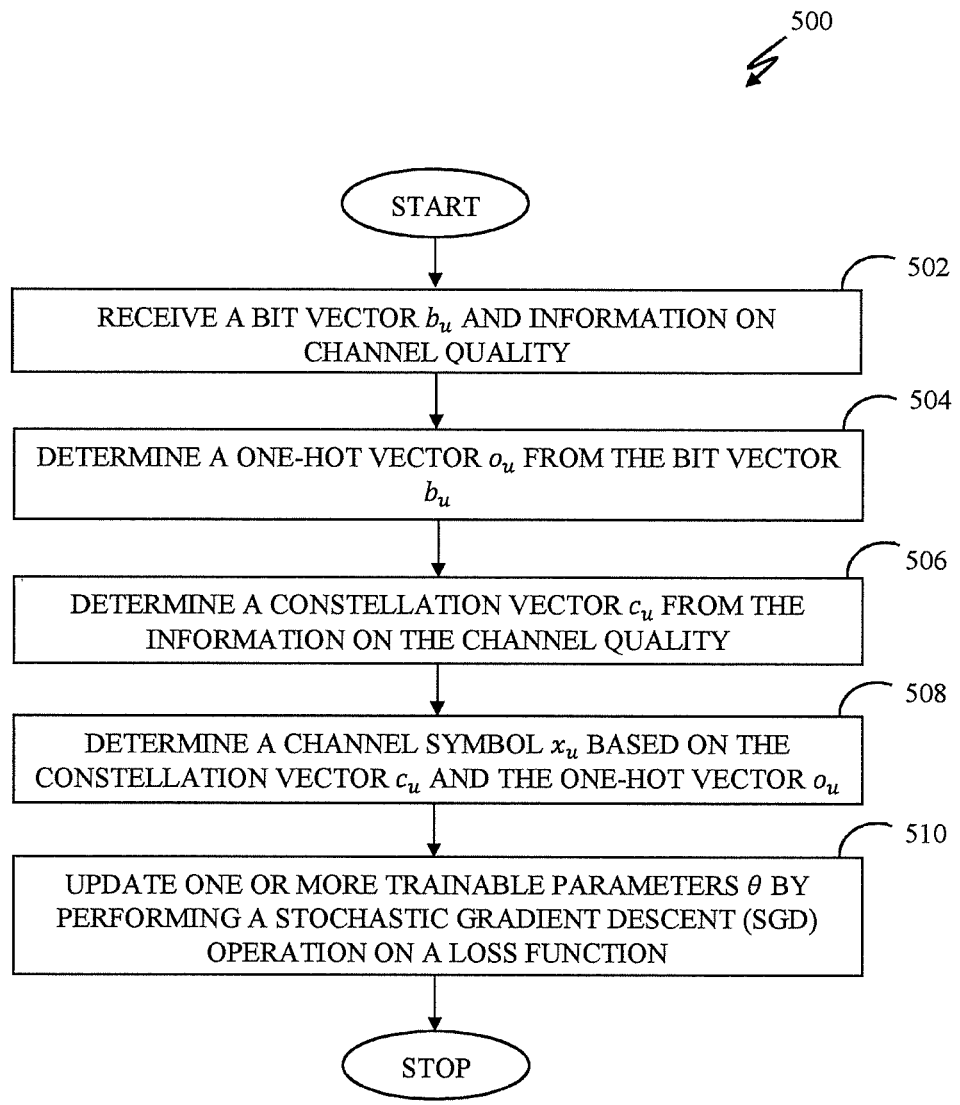
FIG. 5 illustrates a flowchart showing a method for optimization of signal shaping for the MU-MIMO communication system, using a GSLB, according to an example embodiment R of the subject matter described herein.

FIG. 4 illustrates a flowchart 400 showing a high level operation of a method for optimization of signal shaping for the MU-MIMO communication system 100. FIG. 4 is described in conjunction with FIGS. 2 and 3. Preferred steps of the method for optimization of the signal shaping for the MU-MIMO communication system 100 according to further embodiments are illustrated in FIG. 5.

At first, a bit vector $b_u$ and a channel state information (CSI) vector are received, at step 402. In one example embodiment, the transmitter 102 may receive the bit vector $b_u$, where $b_u \in \{0,1\}^{k_u}$, $u \in \{1, \ldots, U\}$ and the CSI vector. Successively, a one-hot vector $o_u$ is determined from the received bit vector $b_u$, at step 404. In one example embodiment, the one-hot block 202 may determine the one-hot vector $o_u$ by converting the bit vector $b_u$ into a vector of dimension k containing only zeroes except a one at the position having $b_u$ as binary representation. Successively, a constellation vector $c_u$ is determined from the CSI vector, at step 406. In one example embodiment, the constellation vector $c_u$ may be determined from the CSI vector, using the GSLB 204. It should be noted that the constellation vector $c_u$ may be determined from a received signal strength indicator (RSSI) as well, without departing from the scope of the disclosure.

Further, the GSLB 204 may be configured to implement an algorithm with the one or more trainable parameters $\theta$, by the neural network. In one example embodiment, the neural network may be the algorithm with the one or more trainable parameters $\theta$. Successively, the GSLB 204 may determine the constellation vector $c_u$, for modulating the bit vector $b_u$ to a channel symbol $x_u$. It should be noted that the channel symbol $x_u$ may be determined based at least on the determined one-hot vector $o_u$ and the constellation vector $c_u$. In one example embodiment, the channel symbol $x_u$ may be defined as:

$$x_u = o_u^T c_u$$

Thereafter, the channel symbol $x_u$ is sent, at step 408. In one example embodiment, the transmitter 102 may send the channel symbol $x_u$ over the channel 106 to the receiver 104. It should be noted that sending operation may comprise modulating the channel symbol $x_u$ on a sub-carrier (and for multiple symbols in parallel), spreading with a Discrete Fourier transform (DFT) matrix followed by an Inverse Fast Fourier transform (IFFT) operation, adding a cyclic prefix, and mixing onto a carrier.

FIG. 5 illustrates a flowchart 500 showing a method for optimization of signal shaping for the MU-MIMO communication system 100, using a GSLB 204. according to an example embodiment.

At first, a bit vector $b_u$ and information on channel quality may be received, at step 502. The information on the channel quality may comprise channel state information (CSI) such as signal-to-noise ratio (SNR), a received signal strength indicator (RSSI), or channel quality indications (CQI). Successively, a one-hot vector $o_u$ may be determined from the received bit vector $b_u$, at step 504. In one example embodiment, the one-hot vector $o_u$ may be determined by converting the bit vector $b_u$ into a vector of dimension k containing only zeroes except a one at the position having $b_u$ as binary representation. The one-hot vector $o_u$ may be defined as: onehot($b_u$)=$o_u$. In one example embodiment, if $b_u$=[0,1,1], then onehot($b_u$)=[0,0,0,1,0,0,0]$^T$.

Successively, a constellation vector $c_u$ may be determined from the information on the channel quality, at step 506. The constellation vector $c_u$ may be determined using the GSLB 204. It should be noted that the GSLB 204 present within each transmitter 102, may be configured to implement an algorithm with one or more trainable parameters θ, by a neural network. In one example embodiment, the neural network may be the algorithm with the one or more trainable parameters θ. The one or more trainable parameters θ may be the parameters R of the algorithm. The term "algorithm having trainable parameters θ" or "algorithm with trainable parameters θ" may be a trained algorithm whose parameters have values, wherein the values are obtained by training the algorithm. In one example embodiment, the parameters such as, but are not limited to, learning rate, batch size, and other parameters of the SGD variant such as Adam or RMSProp, may be the parameters of the algorithm. Such parameters may be used to determine good values for the one or more trainable parameters θ.

In one example embodiment, the constellation may be, for example, a quadrature amplitude modulation (QAM) and the labeling scheme may be, for example, Gray labeling. In another example embodiment, the constellation vector $c_u$ may be determined independently i.e. instead of being generated by a neural network fed with the information on the channel quality. In one example embodiment, the constellation vector $c_u$ may be the trainable parameter θ directly, i.e. θ=$c_u$. The determined constellation vector $c_u$ may be used for modulating the bit vector $b_u$ to a channel symbol $x_u$. In one example embodiment, the channel symbol $x_u$ may be determined based at least on the constellation vector $c_u$ and the one-hot vector $o_u$, at step 508. The channel symbol $x_u$ may be defined as:

$$x_u = \text{onehot}(b_u)^T c_u = o_u^T c_u, \text{ where } x_u \in \mathbb{C}$$

In another example embodiment, the channel symbol $x_u$ may be determined by selecting an element from the constellation vector $c_u$ for the bit vector $b_u$. It will be apparent to one skilled in the art that the above-mentioned determination of the channel symbol $x_u$ has been provided only for illustration purposes, without departing from the scope of the disclosure. Thereafter, the one or more trainable parameters θ may be updated, at step 510. The one or more trainable parameters θ may be updated by performing a stochastic gradient descent (SGD) operation on a loss function. In one example embodiment, the loss function may be defined as:

$$L(\theta) = -\frac{1}{B} \sum_{b=1}^{B} \sum_{u=1}^{U} \sum_{i=1}^{k} \left( b_{u,i}^{(b)} \log\left(p_{u,i}^{(b)}\right) + \left(1 - b_{u,i}^{(b)}\right) \log\left(1 - b_{u,i}^{(b)}\right) \right)$$

where $p_{u,i}^{(b)}$ is the probability that the $i^{th}$ bit sent by the $u^{th}$ user is set to one for the $b^{th}$ training example.

It should be noted that the SGD operation may be performed until a predefined stop criterion has been satisfied, the predefined stop criterion including a predefined number of iterations or the loss function has not decreased for a predefined number of iterations. It will be apparent to one skilled in the art that updating the one or more trainable parameters θ may assist in optimizing the signal shaping for the MU-MIMO communication system 100 and thus results in maximizing the information rate or communication rate in the MU-MIMO communication system 100.

Figure 6:
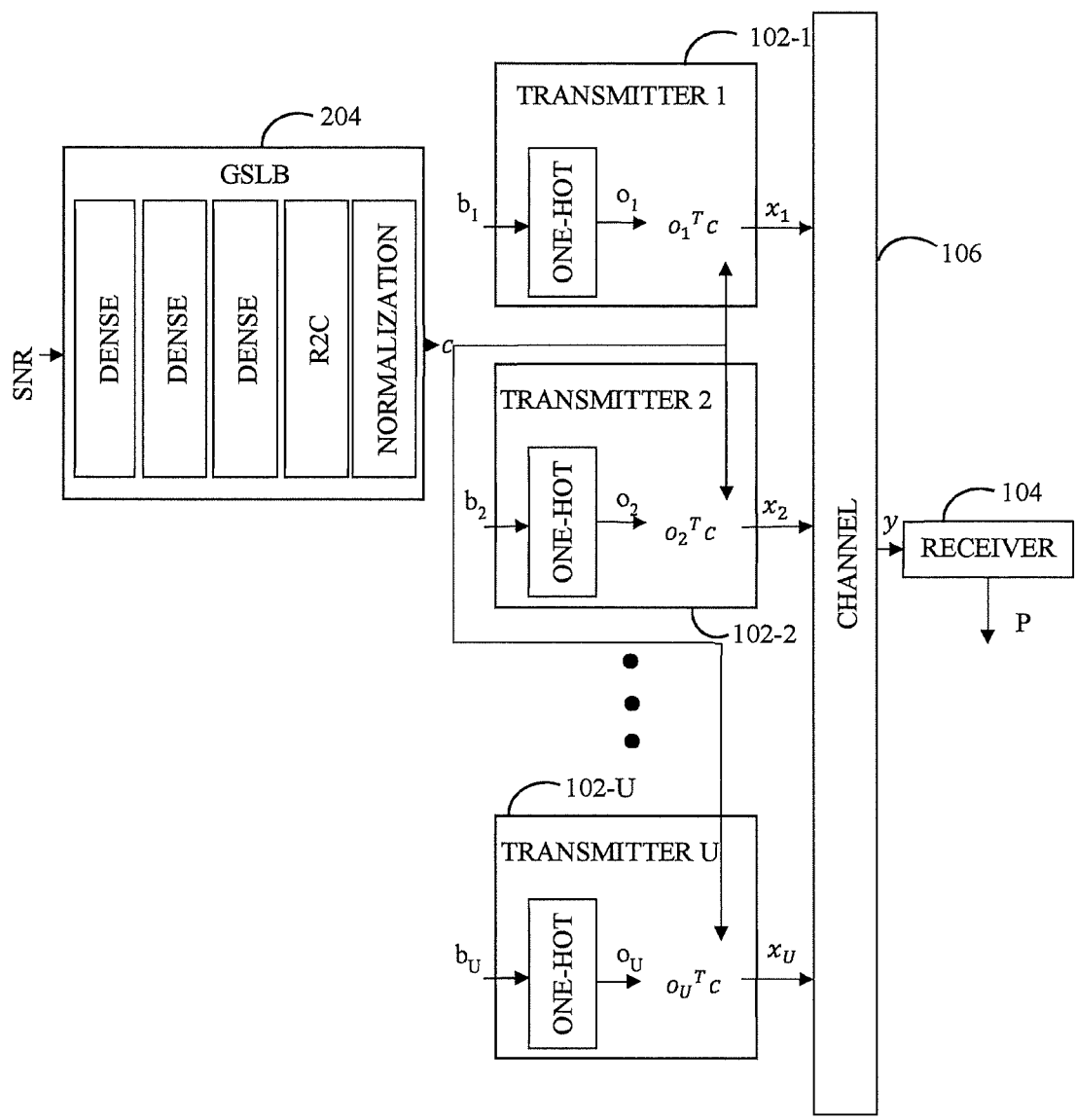
FIG. 6 illustrates a block diagram showing a MU-MIMO communication system for optimization of signal shaping by using a shared GSLB for each one of the transmitter during training, according to an example embodiment of the subject matter described herein.

FIG. 6 illustrates a block diagram showing the MU-MIMO communication system 100 for optimization of signal shaping, by using a shared geometric shaping and labeling block (GSLB) 204 for each one of the transmitter 102 during training, according to an example embodiment. As discussed above, the MU-MIMO communication system 100 may comprise the plurality of transmitters 102 communicating with the receiver 104, via the channel 106. Each one of the transmitter 102 may comprise the one-hot block 202 along with the shared GSLB 204. FIG. 6 is described in conjunction with FIGS. 1, 2, and 3.

At first, the transmitter 102 may receive bit vectors b=($b_1$, $b_2$, ... $b_U$) $b_u \in \{0,1\}^{k_u}$ Successively, the bit vector $b_u$ may be provided to the one-hot block 202. The one-hot block 202 may convert the bit vector $b_u$ into a vector of dimension k containing only zeroes except a one at the position having $b_u$ as binary representation, to obtain a one-hot vector $o_u$. The one-hot vector $o_u$ may be defined as: onehot($b_u$)=$o_u$. For example, if $b_u$=[0,1,1], then onehot($b_u$)=$[0,0,0,0,1,0,0,0]^T$. Successively, the GSLB 204 may determine a constellation vector $c_u$ from at least the information on channel quality, for each one of the transmitter 102. It should be noted that the information on the channel quality may be as input to the algorithm with the one or more trainable parameters θ. The information on the channel quality may comprise channel state information (CSI) such as signal-to-noise ratio (SNR), a received signal strength indicator (RSSI), or channel quality indications (CQI). As shown in FIG. 6, the SNR corresponding to the information on the channel quality may be used for determining the constellation vector $c_u$. The constellation vector $c_u$ may be defined as $c_u \in \mathbb{C}^{2^k}$.

It should be noted that a single GSLB 204 may be shared with each one of the transmitter 102 and may be configured to implement an algorithm with the one or more trainable parameters θ, by a neural network. In one example embodiment, the neural network may be the algorithm with the one or more trainable parameters θ. The one or more trainable parameters θ may be the parameters of the algorithm. The term "algorithm having trainable parameters θ" or "algorithm with trainable parameters θ" may be a trained algorithm whose parameters have values, wherein the values are obtained by training the algorithm. The algorithm with the one or more trainable parameters θ (for example, a neural network) may be used to jointly learn constellation shaping and labeling used by each one of the transmitter 102 in the channel 106. The constellations and labelings may be optimized for certain channel characteristics, impairments at the transmitter 102 and the receiver 104, and for a given receiver 104 and demapping algorithm.

In one example embodiment, the parameters such as, but are not limited to, learning rate, batch size, and other parameters of the SGD variant such as Adam or RMSProp, may be the parameters of the algorithm. Such parameters may be used to determine good values for the one or more trainable parameters θ. The determined constellation vector $c_u$ may be used for modulating the bit vector b to a channel symbol $x_u$. In one example embodiment, the channel symbol $x_u$ may be defined as:

$$x_u = \text{onehot}(b_u)^T c_u = o_u^T c_u, \text{ where } x_u \in \mathbb{C}.$$

Thereafter, the modulated channel symbols i.e. $x=[x_1, \ldots, x_U]^T$ may be transmitted over the channel 106 to the receiver 104. In one example embodiment, the modulated channel symbol $x_u$ from each transmitting antenna may then be received by the receiving antenna at the receiver 104. The path between each transmitting antenna and each receiving antenna may be modelled by a transfer function and the overall channel transfer function may be formed from the combination of these transfer functions to define a function as follows:

$$y = Hx + n$$

where $y \in \mathbb{C}^N$ is the vector of received samples, N is the number of antennas at the receiver 104,
$H \in \mathbb{C}^{N \times U}$ the channel matrix, and
$n \in \mathbb{C}^N$ the receiver noise vector.

It will be apparent to one skilled in the art that above-mentioned MIMO channel model has been provided only for illustration purposes. In one example embodiment, additional impairments may be added on top of this model due to hardware, without departing from the scope of the disclosure.

Successively, the receiver 104 may extract data indicative of the original transmission signals. In one example embodiment, the receiver 104 may be configured to perform a MIMO detection of the bit vectors $b_1, \ldots, b_U$, where $b_u \in \{0,1\}^{k_u}$, $u \in \{1, \ldots, U\}$, with $k_u$ the number of bits per channel use for each one of the transmitter 102. As discussed above, the receiver 104 may comprise the demodulator 110 and the demapper 112. It should be noted that the receiver 104 may be configured to implement a demodulation and/or a demapping algorithm with one or more trainable parameters $\Phi$. At the receiver 104, the demodulation and/or demapping algorithm may either be a traditional non-trainable algorithm or a trainable one.

The demodulator 110 may be fed with the noisy signal y and possibly an estimated of the signal to noise ratio and outputs probabilities over the bits $P = \{p_{u,i}\}_{(u,i)}$, where $p_{u,i}$ denotes the probability that the $i^{th}$ transmitted bit by the $u^{th}$ transmitter 102 was set to 1. It should be noted that traditional demodulation algorithms may include, but are not limited to, linear minimum mean squared (LMMSE) detector, zero forcing (ZF), and matched filter (MF) equalizer.

In one example embodiment, the demapper 112 may compute log likelihood ratios (LLRs). The LLRs may be defined as $$l_{u,i} = \log\left(\frac{p_{u,i}}{1 - p_{u,i}}\right).$$

Thereafter, the LLRs (i.e. soft-information) may then subsequently be fed to a channel decoder (not shown). In one example embodiment, the channel decoder may be, but is not limited to, belief propagation decoding, polar list-decoding, Turbo decoder, or convolutional decoder. In one example embodiment, the demapper 112 may be implemented by an algorithm with the one or more trainable parameters $\Phi$, by the neural network. Examples of the neural network based demodulation algorithms may include, but are not limited to, deterministic networking (DetNet), Massive MIMO Network (MMNet), and Hyper-MIMO. In one example embodiment, the neural network may be deep feedforward neural network.

It will be apparent to one skilled in the art that the above-mentioned MU-MIMO communication system 100 for optimization of signal shaping, by using a common geometric shaping and labeling block (GSLB) 204 during training, has been provided only for illustration purposes. In one example embodiment, each one of the transmitter 102 may use different the GSLB 204 in the MU-MIMO communication system 100 as well, without departing from the scope of the disclosure.

Figure 7:
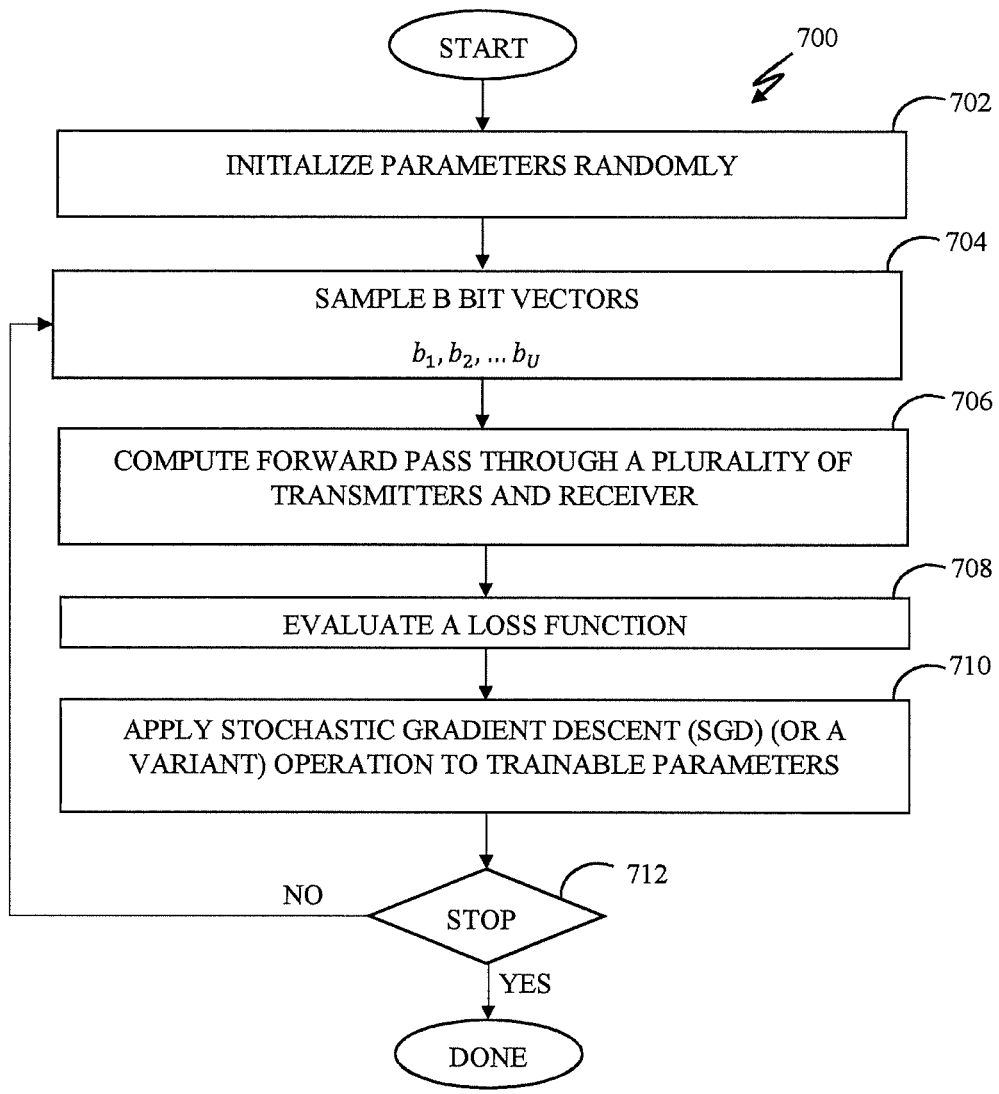
FIG. 7 illustrates a flowchart showing a method for training one or more trainable parameters of the GSLB, according to an example embodiment of the subject matter described herein.

FIG. 7 illustrates a flowchart 700 showing a method for training one or more trainable parameters θ of the GSLB 204, according to an example embodiment. FIG. 7 is described in R conjunction with FIG. 6.

At first, one or more trainable parameters θ may be initialized, at step 702. The one or more trainable parameters θ may be initialized randomly. In one example embodiment, the parameters such as, but are not limited to, learning rate, batch size, and other parameters of the SGD variant such as Adam or RMSProp, may be the parameters of the algorithm. Such parameters may be used to determine good values for the one or more trainable parameters θ. Successively, a plurality of bit vectors $b = (b_1, b_2, \ldots, b_u)$ may be sampled, at step 704. It should be noted that, using simulations, a controlling circuitry may generate B samples of the bit vector $b = [b_1 \ldots b_K]$ and output signal $y: \{b^{(j)} = [b_1^{(j)}, \ldots, b_K^{(j)}], y^{(j)}, j = 1 \ldots B\}$, where B is batch size.

Successively, the constellation vector $c_u$ may be determined from the information on the channel quality. Successively, each bit vector $b_u$ may be mapped to the constellation vector $c_u$, to obtain the channel symbol $x_u$. Successively, the channel symbol $x_u$ may be transmitted to the receiver 104, via the channel 106. It should be noted that the receiver 104 may observe channel outputs using a trainable MIMO detection algorithm and the computed LLRs on the transmitted bits.

Successively, a forward pass through the plurality of transmitters 102 and the receiver 104 may be determined, at step 706. Successively, a loss function L may be determined based at least on the plurality of bit vectors b, at step 708. It should be noted that the loss function may be determined from transmitted bits (known by the receiver 104 at the training) and the output of the demapper 112 (i.e. LLRs) determined from the observed channel outputs. Further, the loss function L may correspond, up to a constant, to the bit metric decoding rate, which is an achievable rate for practical systems and that operates on bits. It should be noted that the loss function may be an estimate of the bit metric decoding rate up to a constant. Further, as the loss function L operates on bits, optimizing the constellation on the loss function L leads to joint optimization of the constellation shaping and bit labelling. In one example embodiment, the loss function may be defined as:

$$L(\theta) = -\frac{1}{B}\sum_{b=1}^{B}\sum_{u=1}^{U}\sum_{i=1}^{k}\left(b_{u,i}^{(b)}\log(p_{u,i}^{(b)}) + (1 - b_{u,i}^{(b)})\log(1 - b_{u,i}^{(b)})\right)$$

where $p_{u,i}^{(b)}$ is the probability that the $i^{th}$ bit sent by the $u^{th}$ user is set to one for the $b^{th}$ training example.

Successively, stochastic gradient descent (SGD) (or a variant) operation may be applied to update the one or more trainable parameters θ, at step 710. In one example embodiment, the controlling circuitry may perform the SGD operation to update the one or more trainable parameters θ. In one example embodiment, the SGD operation may be performed until a predefined stop criterion has been satisfied. The predefined stop criterion may include, but is not limited to, a predefined number of iterations or the loss function has not decreased for a predefined number of iterations. It should be noted that the controlling circuitry may evaluate the stop criterion.

Thereafter, it may be determined whether the predefined stop criterion has been satisfied, at step 712. In one case, if the predefined stop criterion has been satisfied, then the training process terminates. In another case, if the predefined stop criterion has not been satisfied, then the method may follow the step 702 to 712. Such updating of the one or more trainable parameters θ assists in optimizing the signal shaping for the MU-MIMO communication system 100 and thus results in maximizing the information rate or communication rate in the MU-MIMO communication system 100.

In one example embodiment, the receiver 104 may be configured to implement a demodulation and/or a demapping algorithm with one or more trainable parameters Φ, as discussed above. In one example embodiment, the demapper 112 may be implemented by an algorithm with the one or more trainable parameters Φ, by the neural network. In such case, the one or more trainable parameters θ may be jointly initialized with the one or more trainable parameters Φ. Thereafter, the stochastic gradient descent (SGD) may be applied on the loss function, to jointly update the one or more trainable parameters θ and the one or more trainable parameters Φ. It should be noted that the constellation schemes and labelings of each transmitter 102 in the MU-MIMO communication system 100 may be jointly optimized for the receiver 104 in order to maximize the information rate and thus optimizes the bit-labeling of the constellation points.

Figure 8:
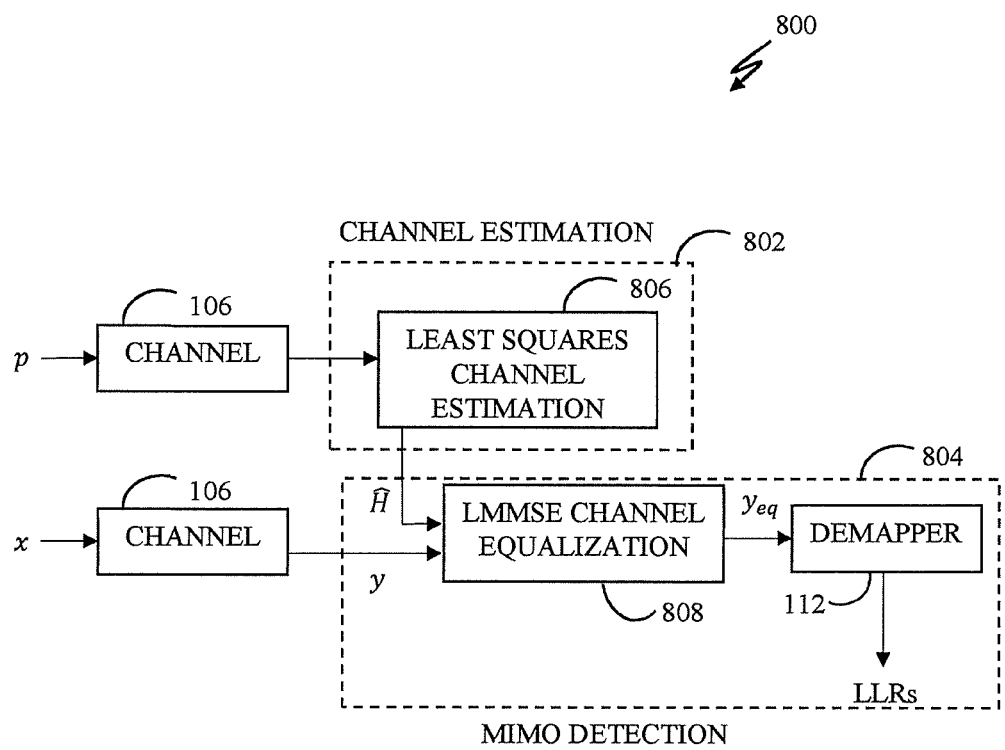
FIG. 8 illustrates a block diagram showing a standard MIMO detection algorithm implementation at a receiver, according to another example embodiment of the subject matter described herein.

FIG. 8 illustrates a block diagram showing a standard MIMO detection algorithm 800 implementation at the receiver 104, in the MU-MIMO communication system 100, according to an example embodiment. The standard MIMO detection algorithm 800 implementation comprising a channel estimation block 802 and a MIMO detection block 804. The channel estimation block 802 may comprise a least squares estimation block 806. Further, the MIMO detection block 804 may comprise a linear minimum mean squared estimator (LMMSE) channel equalization block 808 and the demapper 112.

At first, x is the vector of send channel symbols $x=[x_1, \ldots, x_U]^T$. Further, the MIMO detection block 804 may receive the vector of received channel symbols y as an input and a channel matrix H (or and estimation Ĥ). In one example embodiment, the received channel symbols may be first equalized, based on the LMMSE, and then may result into equalized symbols $y_{eq}$. Thereafter, the equalized symbols $y_{eq}$ may be provided to the demapper 112, which may further compute LLRs to be fed to a channel decoder (not shown), without departing from the scope of the disclosure. It should be noted that the channel estimation block 802 may be performed by sending pilots signal p through the channel 106, according to standard implementation.

It will be apparent to one skilled in the art that above mentioned standard MIMO detection algorithm 800 implementation at the receiver 104, in the MU-MIMO communication system 100 has been provided only for illustration purposes, without departing from the scope of the disclosure.

Figure 9A:
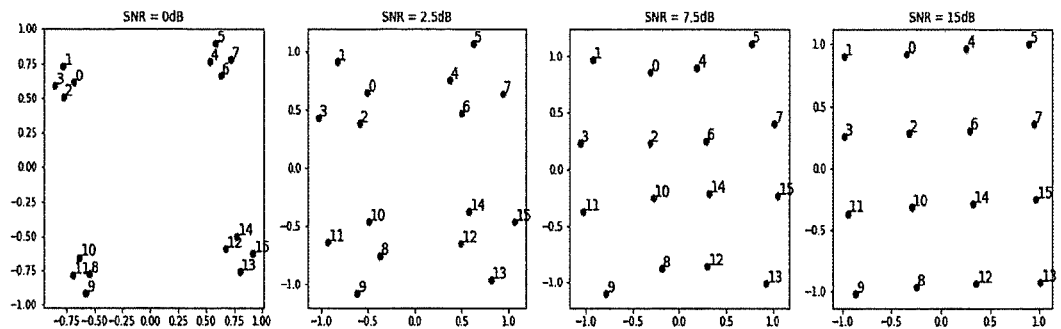
FIGS. 9A and 9B illustrate graphs showing a comparison between a learned constellation and shaping and a traditional 16 quadrature amplitude modulation (16QAM), according to an example embodiment of the subject matter described herein.
Figure 9B:
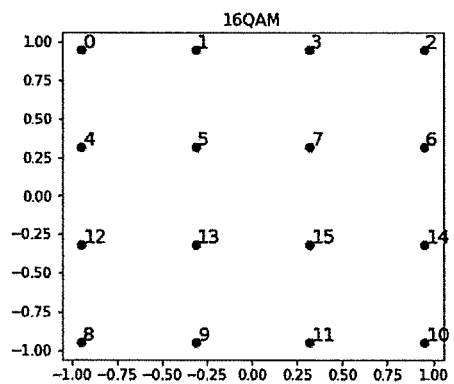

FIGS. 9A and 9B illustrate graphs showing a comparison between a learned constellation and shaping 900A and a traditional 16QAM 900B, according to an example embodiment. It should be noted that the modulation order for both the constellations is 16 and w labelling is shown in its decimal form. For example, label 2 corresponds to bits "0010". As shown in FIG. 9A, the geometry of the constellation is optimized for each SNR. In one example embodiment, the SNR may be defined as the ratio of the average energy per constellation point over the average energy of a noise baseband symbol. It should be noted that as compared to the traditional QAM (shown as 900B), the geometry of learned constellation (shown as 900A) deviates to achieve the highest possible communication rate.

Figure 10A:
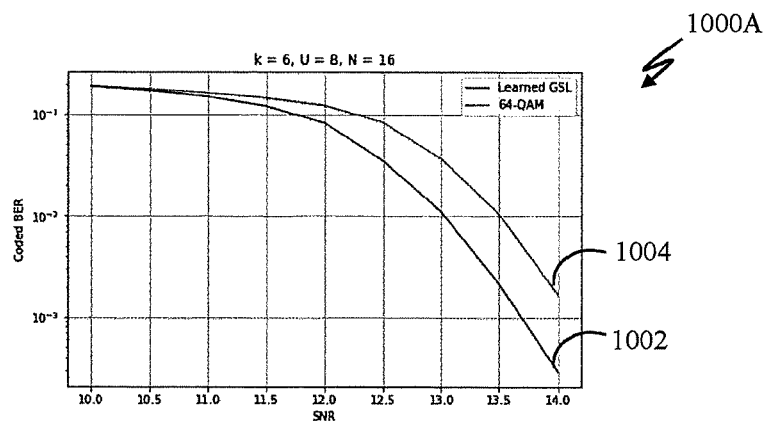
FIGS. 10A and 10B illustrate graphs showing simulation results, according to another example embodiment of the subject matter described herein.
Figure 10B:
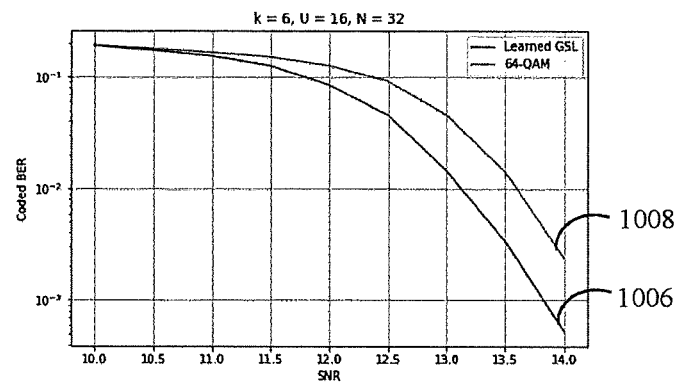

FIGS. 10A and 10B illustrate graphs 1000A and 1000B showing simulation results respectively, according to an example embodiment. As shown in the graph 1000A, a line (shown by 1002) represents a learned GSL and a line (shown by 1004) represents 64-QAM for settings (U,N)=(8,16). Similarly, as shown in the graph 1000B, a line (shown by 1006) represents a learned GSL and a line (shown by 1008) represents 64-QAM for settings (U,N)=(16,32).

In one example embodiment, two settings are evaluated i.e. (U,N)=(8,16) and (U,N)=(16,32) and are compared to a conventional 64-QAM modulation with Gray labelling on a Rayleigh channel, as shown in the graphs illustrated in FIGS. 10A and 10B respectively. It should be noted that coherent detection may be considered i.e. a channel matrix is assumed to be perfectly known at the receiver 104, with the LMMSE detection followed by a classical symbol demapper for an additive white gaussian noise (AWGN) channel. Further, the SNR is provided as input to the GSLB 204 and the parameters of the GSLB 204 are shared with the transmitters 102, with the number of bits per channel use set k=6. It should be noted that a standard IEEE 802.11n code with a code rate of ½ and a block length of 1296 bits is used. Further, to achieve a coded bit error rate (BER) of $10^{-2}$, the learned system required 0.5 dB less compared to conventional 64-QAM.

Figure 11:
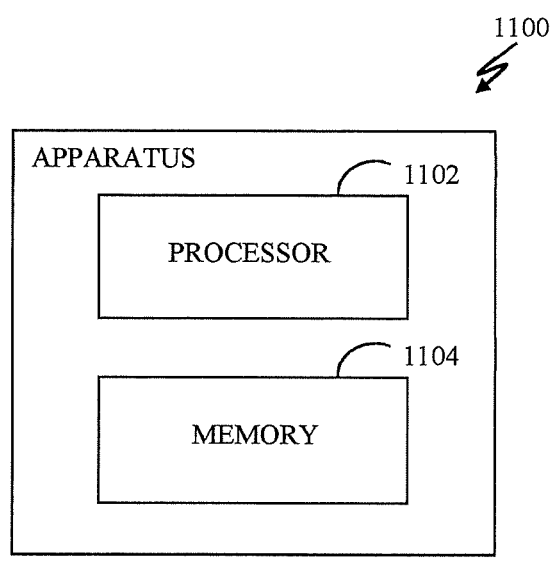
FIG. 11 illustrates a block diagram showing one or more components of an apparatus, according to one example embodiment of the subject matter described herein.

FIG. 11 is a block diagram showing one or more components of an apparatus 1100, according to an example embodiment. The apparatus 1100 may include a processor 1102 and a memory 1104.

The processor 1102 includes suitable logic, circuitry, and/or interfaces that are operable to execute instructions stored in the memory to perform various functions. The processor 1102 may execute an algorithm stored in the memory for optimization of the signal shaping for the MU-MIMO communication system 100. The processor 1102 may also be configured to decode and execute any instructions received from one or more other electronic devices or server(s). The processor 1102 may include one or more general-purpose processors (e.g., INTEL® or Advanced Micro Devices® (AMD) microprocessors) and/or one or more special-purpose processors (e.g., digital signal processors or Xilinx® System On Chip (SOC) Field Programmable Gate Array (FPGA) processor). The processor 1102 may be further configured to execute one or more computer-readable program instructions, such as program instructions to carry out any of the functions described in the description.

Further, the processor 1102 may make decisions or determinations, generate frames, packets or messages for transmission, decode received frames or messages for further processing, and other tasks or functions described herein. The processor 1102, which may be a baseband processor, for example, may generate messages, packets, frames or other signals for transmission via wireless transceivers. It should be noted that the processor 1102 may control transmission of signals or messages over a wireless network, and may control the reception of signals or messages, etc., via a wireless network (e.g., after being down-converted by wireless transceiver, for example). The processor 1102 may be (or may include), for example, hardware, programmable logic, a programmable processor that executes software or firmware, and/or any combination of these. Further, using other terminology, the processor 1102 along with the transceiver may be considered as a wireless transmitter/receiver system, for example.

The memory 1104 stores a set of instructions and data. Further, the memory 1104 includes one or more instructions that are executable by the processor to perform specific operations. Some of the commonly known memory implementations include, but are not limited to, fixed (hard)

drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, cloud computing platforms (e.g. Microsoft Azure and Amazon Web Services, AWS), or other type of media/machine-readable medium suitable for storing electronic instructions.

It will be apparent to one skilled in the art that the above-mentioned components of the apparatus 1100 have been provided only for illustration purposes. In one example embodiment, the apparatus 1100 may include an input device, output device etc. as well, without departing from the scope of the disclosure.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical N cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

The detailed description section of the application should state that orders of method steps are not critical. Such recitations would later support arguments that the step order in a method claim is not critical or fixed. Features that are described and/or illustrated with respect to one embodiment may be used in the same way or in a similar way in one or more other embodiments and/or in combination with or instead of the features of the other embodiments.

While the above embodiments have been illustrated and described, as noted above, many changes can be made without departing from the scope of the example embodiments. For example, aspects of the subject matter disclosed herein may be adopted on alternative operating systems. Accordingly, the scope of the example embodiments is not limited by the disclosure of the embodiment. Instead, the example embodiments should be determined entirely by reference to the claims that follow.

What is claimed is:

1. An apparatus for optimization of signal shaping for a multi user multiple input multiple output communication system, comprising:
   circuitry configured for receiving a bit vector; and
   circuitry configured for determining a constellation vector,
   wherein the circuitry configured for determining the constellation vector comprises a geometric shaping and labeling block for modulating the bit vector,
   wherein the geometric shaping and labeling block is configured to implement an algorithm with one or more parameters having at least one value obtained with training the algorithm.

2. The apparatus of claim 1, further comprising:
   circuitry configured for determining a one-hot vector from the bit vector; and
   circuitry configured for determining a channel symbol based on the determined one-hot vector and the constellation vector, wherein the constellation vector is determined from information on channel quality.

3. The apparatus of claim 1, wherein the apparatus is configured to implement the algorithm with the one or more parameters with a neural network.

4. The apparatus of claim 1, wherein the geometric shaping and labeling block comprises of one or more dense layers, a real-to-complex conversion layer, and a normalization layer, and each one of the dense layers having one or more activation functions, and wherein the one or more dense layers of the geometric shaping and labeling block comprise the one or more parameters.

5. The apparatus of claim 1, further comprising:
   circuitry configured for updating the one or more parameters with performing a stochastic gradient descent operation on a loss function.

6. The apparatus of claim 1, wherein the stochastic gradient descent operation is performed until a predefined stop criterion has been satisfied, the predefined stop criterion including a predefined number of iterations or the loss function has not decreased for a predefined number of iterations.

7. A multi-user multiple input multiple output communication system comprising a plurality of transmitters, each transmitter being implemented with an apparatus according to claim 1.

8. The multi-user multiple input multiple output communication system of claim 7, wherein the transmitters of the plurality of transmitters are configured to share one or more parameters of the geometric shaping and labeling block.

9. The multi-user multiple input multiple output communication system of claim 7, further comprising a multiple input multiple output channel and a receiver, wherein the receiver is configured to implement a demodulation and/or a demapping algorithm with one or more parameters.

10. A method for optimization of signal shaping for a multi-user multiple input multiple output communication system, the multi-user multiple input multiple output communication system comprising a plurality of transmitters, the method comprising at each transmitter:
    receiving a bit vector; and
    determining a constellation vector,
    wherein the constellation vector is determined using a geometric shaping and labeling block for modulating the bit vector,
    wherein the geometric shaping and labeling block is configured to implement an algorithm with one or more parameters having at least one value obtained with training the algorithm.

11. The method of claim 10, further comprising at each transmitter:
    determining a one-hot vector from the bit vector; and
    determining a channel symbol based on the determined one-hot vector and the constellation vector, wherein the constellation vector is determined from information on channel quality.

12. The method of claim 10, wherein the algorithm is implemented with a neural network.

13. The method of claim 10, further comprising:
training the geometric shaping and labeling block by:
initializing the one or more parameters;
sampling a plurality of bit vectors;
determining a loss function based at least on the plurality of bit vectors; and
updating the one or more parameters with performing a stochastic gradient descent operation on the loss function, wherein the stochastic gradient descent operation is performed until a predefined stop criterion has been satisfied, the predefined stop criterion including a predefined number of iterations or the loss function is stable for a number of iterations.

14. The method of claim 13, wherein the multi-user multiple input multiple output communication system comprises a multiple input multiple output channel and a receiver, and wherein the initializing step comprises jointly initializing the one or more parameters and one or more parameters, and the updating step comprises jointly updating the one or more parameters.

15. A non-transitory computer-readable medium including instructions for causing a processor to perform functions for optimization of signal shaping for a multi-user multiple input multiple output communication system, the functions including:
receiving a bit vector; and
determining a constellation vector,
wherein the constellation vector is determined using a geometric shaping and labeling block for modulating the bit vector,
wherein the geometric shaping and labeling block is configured to implement an algorithm with one or more parameters having at least one value obtained with training the algorithm.

* * * * *